(12) United States Patent
Baier et al.

(10) Patent No.: US 11,097,744 B2
(45) Date of Patent: Aug. 24, 2021

(54) METHOD AND CONTROL UNIT FOR OPERATING A DRIVER ASSISTANCE SYSTEM OF A VEHICLE

(71) Applicant: Robert Bosch GmbH, Stuttgart (DE)

(72) Inventors: Sebastian Baier, Munich (DE); Thorsten Schori, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 16/453,521

(22) Filed: Jun. 26, 2019

(65) Prior Publication Data

US 2020/0017121 A1 Jan. 16, 2020

(30) Foreign Application Priority Data

Jul. 11, 2018 (DE) .......................... 102018211551.6

(51) Int. Cl.
*B60W 50/10* (2012.01)
*B60W 30/18* (2012.01)
*B60W 50/00* (2006.01)

(52) U.S. Cl.
CPC ............ *B60W 50/10* (2013.01); *B60W 30/18* (2013.01); *B60W 2050/0073* (2013.01); *B60W 2540/10* (2013.01); *B60W 2556/00* (2020.02)

(58) Field of Classification Search
CPC ..... B60W 2556/00; B60W 2050/0073; B60W 2540/10; B60W 2550/00; B60W 2550/10; B60W 2550/20; B60W 50/10; B60W 30/00; B60W 30/08; B60W 30/085; B60W 30/09; B60W 30/0953; B60W 30/10; B60W 30/14; B60W 30/143; B60W 30/146; B60W 30/16; B60W 30/162; B60W 30/17; B60W 30/18; B60W 30/18027; B60W 30/18063; B60W 30/18072
USPC .......................................................... 701/23
See application file for complete search history.

(56) References Cited

U.S. PATENT DOCUMENTS

| | | | |
|---|---|---|---|
| 2003/0135318 A1* | 7/2003 | Tellis ..................... | B60W 30/16 701/96 |
| 2005/0010352 A1* | 1/2005 | Michi ................... | B60W 30/17 701/96 |

* cited by examiner

*Primary Examiner* — Anthony R Jimenez
(74) *Attorney, Agent, or Firm* — Norton Rose Fulbright US LLP; Gerard Messina

(57) ABSTRACT

A method for operating a driver assistance system of a vehicle, in which interventions activated by the driver assistance system in a travel mode of the vehicle are at least partially suspended for a predetermined time window when an override intent of a driver of the vehicle is recognized.

13 Claims, 1 Drawing Sheet

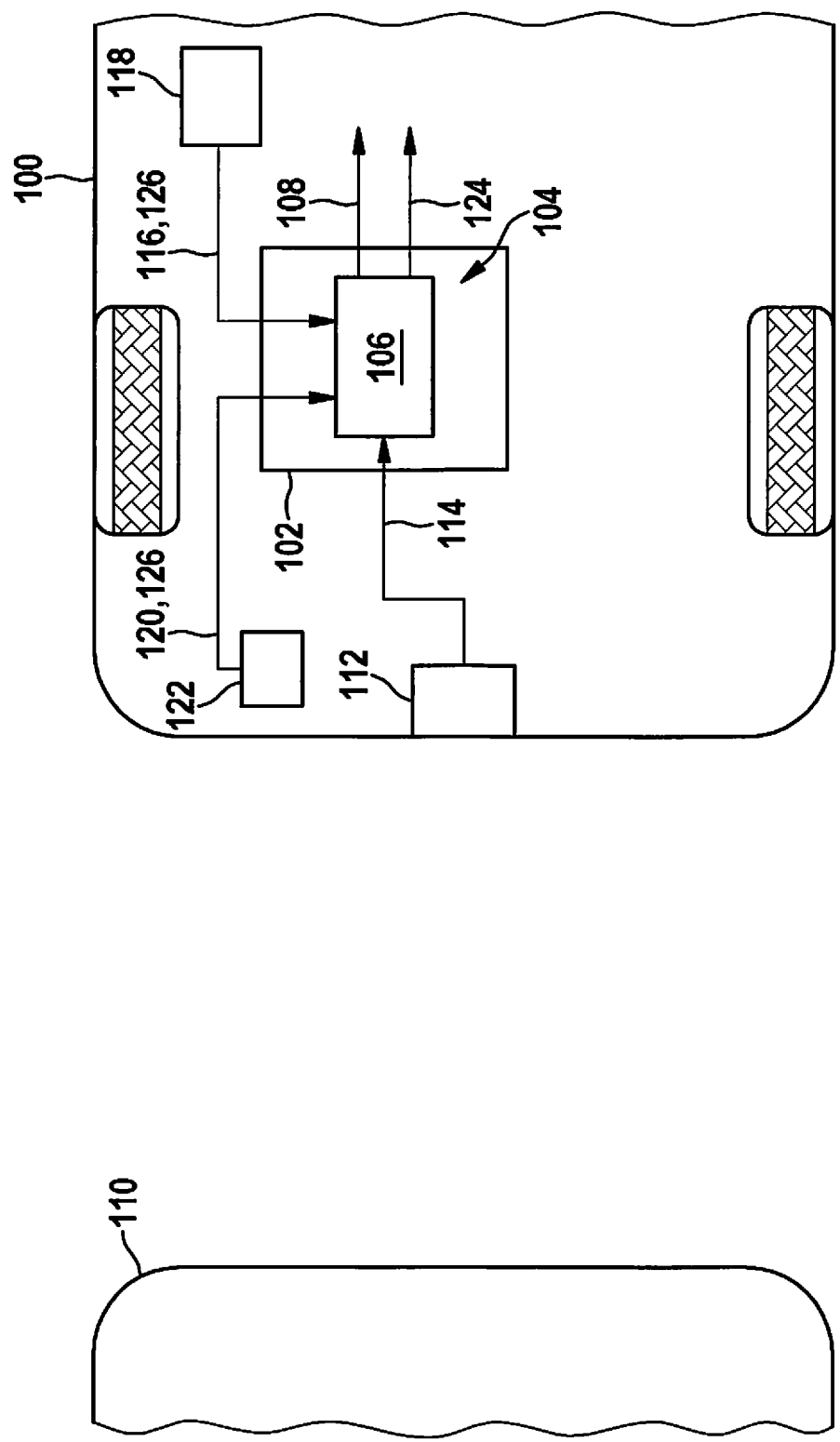

METHOD AND CONTROL UNIT FOR OPERATING A DRIVER ASSISTANCE SYSTEM OF A VEHICLE

RELATED APPLICATION INFORMATION

The present application claims priority to and the benefit of German patent application no. 10 2018 211 551.6, which was filed in Germany on Jul. 11, 2018, the disclosure of which is incorporated herein by reference.

FIELD OF THE INVENTION

The present invention relates to a method for operating a driver assistance system of a vehicle and a control unit for operating a driver assistance system of a vehicle.

BACKGROUND INFORMATION

In a vehicle including a distance controller, a situation-dependent setpoint distance is set in relation to a preceding vehicle. Upon approach to the preceding vehicle, the distance controller reduces a motor power of the vehicle in relation to a driver intent, which is tapped at an accelerator pedal of the vehicle, of a driver of the vehicle until the vehicle travels behind the preceding vehicle at the setpoint distance at a velocity of the preceding vehicle. The distance controller may be deactivated by a kickdown of the accelerator pedal, for example, in order to overtake the preceding vehicle.

SUMMARY OF THE INVENTION

Against this background, the approach presented here provides a method for operating a driver assistance system of a vehicle and a control unit for operating a driver assistance system of a vehicle, and finally a corresponding computer program product and a machine-readable storage medium according to the independent claims. Advantageous refinements and improvements of the approach presented here result from the description and are described in the dependent claims.

Specific embodiments of the present invention may advantageously enable a distance controller of a vehicle not to be completely deactivated if needed. A base functionality of the distance controller is maintained. The deactivated functions are deactivated for a situation-dependent predetermined time window and not permanently.

A method for operating a driver assistance system of a vehicle is proposed, which is characterized in that interventions controlled by the driver assistance system in a driving mode of the vehicle are at least partially suspended for a predetermined time window if an override intent of a driver of the vehicle is recognized.

Ideas for specific embodiments of the present invention may be considered to be based, inter alia, on the concepts and findings described hereafter.

A driver assistance system may be understood in particular as an accelerator-pedal-controlled distance controller. Interventions of the driver assistance system reduce, for example, a power setpoint value for a motor power in relation to a driver intent input at an accelerator pedal of the vehicle if the vehicle approaches a preceding vehicle at an excessively high velocity and/or falls below a situation-dependent distance target value in relation to the preceding vehicle. In addition, interventions of the driver assistance system may activate brakes of the vehicle to decelerate the vehicle, for example, if the preceding vehicle is slower.

The driver assistance system may also incorrectly interpret an object ahead of the vehicle as a preceding vehicle, however. For example, a vehicle parked on the edge of the road may be interpreted as a preceding vehicle if the road is narrow and curvy. A soft obstacle, such as a plastic bag being blown around, may also be interpreted as a preceding vehicle or as a fixed obstacle. The vehicle is decelerated although a driver of the vehicle may clearly recognize that the braking action is not required.

The driver may deliver an override intent by way of an intentionally executed action. The interventions may thus be briefly reduced or suspended. The driver may thus steer the vehicle past the parked vehicle or drive it over the plastic bag, respectively. The predetermined time window of the override may be specified independently, i.e., without action of the driver, by a control unit executing the method. In particular, the predetermined time window may be selected depending on the situation. For example, the time window may be dependent on an instantaneous velocity of the vehicle and/or a distance to the obstacle. The predetermined time window may typically be a few seconds up to several seconds or even minutes, for example, between 1 second and 3 minutes, which may be between 1 second and 30 seconds.

The override intent may be read in via a manually operable operating element of the vehicle or an accelerator pedal of the vehicle. The operating element may be, for example, a steering column switch or an operating element on a steering wheel of the vehicle. The override intent may be expressed by an actuation of the operating element. The override intent may also be expressed by stepping on the accelerator pedal. The override intent may be recognized if an actuating speed of the accelerator pedal is within a recognition tolerance range. The override intent may thus be differentiated from a kickdown.

The interventions may be suspended if the override intent is recognized while an intervention is activated. The interventions may thus not be suspended in a proactive or leading manner. Since the driver recognizes the reaction of the driver assistance system to the interventions, however, he may react rapidly. The protection by the driver assistance system is thus retained.

The interventions may be suspended if a target object triggering the interventions meets suspension parameters. For example, the object recognized as an obstacle may barely meet the criteria for an obstacle. A recognition reliability may thus be close to a lower limiting value. Conversely, a probability of an incorrect recognition is thus relatively high. In the case of a parking vehicle, for example, a free intermediate space between two opposing vehicles may be estimated to be too narrow. However, the intermediate space may still be wide enough for the vehicle if it is steered slowly through the gap. In the case of the bag, for example, a metal coating may result in a strong echo. Nonetheless, the bag is actually too small to be recognized as a vehicle. The bag is moving. The incorrectly recognized obstacle thus also moves, which is in turn atypical for an actually unmoving obstacle.

The override intent may be recognized if furthermore a confirmation input of the driver is read in. A confirmation input may additionally be read in within a time period after the override intent. A second action independent of the override intent may be classified as a confirmation input. The recognition of the override intent may be secured by the confirmation input.

The confirmation input may be read in via the manually operable operating element of the vehicle or the accelerator pedal of the vehicle. If the override intent is read in via the accelerator pedal, the confirmation input may be read in via the operating element and vice versa. Two separate actions of the driver, which are independent of one another, using different body parts, are thus necessary to partially deactivate the interventions.

Braking interventions activated by the driver assistance system may be at least partially suspended. Threshold values for activating the braking interventions may be changed. The braking interventions may be carried out if the obstacle is reliably recognized as an obstacle. An emergency braking function may be maintained. The driver may recognize due to the beginning of the braking intervention that the driver assistance system is reacting to a recognized obstacle. If the driver classifies the obstacle as not noteworthy, he may output the override intent.

A target object triggering the interventions may be ignored to suspend the interventions. A target object may be the incorrectly recognized obstacle. The target object may be the recognized object closest to the vehicle. By ignoring the target object, the driver assistance system may be switched over to an object more remote from the vehicle.

After passage of the predetermined time window, the suspended interventions may be carried out again. After passage of the predetermined time window, the driver assistance system may operate to the full extent again without action of the driver.

The method may be implemented, for example, in software or hardware or in a mixed form of software and hardware, for example, in a control unit.

The approach presented here furthermore provides a control unit which is configured to carry out, activate, and/or implement the steps of a variant of the method provided here in corresponding devices.

The control unit may be an electrical device including at least one processing unit for processing signals or data, at least one storage unit for storing signals or data, and at least one interface and/or one communication interface for reading in or outputting data which are embedded in a communication protocol. The processing unit may be, for example, a signal processor, a so-called system ASIC, or a microcontroller for processing sensor signals and outputting data signals as a function of the sensor signals. The storage unit may be, for example, a flash memory, an EPROM, or a magnetic storage unit. The interface may be configured as a sensor interface for reading in the sensor signals from a sensor and/or as an actuator interface for outputting the data signals and/or control signals to an actuator. The communication interface may be configured to read in or output the data in a wireless and/or wired manner. The interfaces may also be software modules, which are provided in addition to other software modules on a microcontroller, for example.

A computer program product or computer program is also advantageous, having program code, which may be stored on a machine-readable carrier or storage medium such as a semiconductor memory, a hard drive memory, or an optical memory and is used to carry out, implement, and/or activate the steps of the method according to any one of the above-described specific embodiments, in particular when the program product or program is executed on a computer or a device.

It is to be noted that some of the possible features and advantages of the present invention are described herein with reference to different specific embodiments. Those skilled in the art recognize that the features of the control unit and the method may be combined, adapted, or exchanged in a suitable manner to arrive at further specific embodiments of the present invention.

Specific embodiments of the present invention are described hereafter with reference to the appended drawing; neither the drawing nor the description is to be interpreted as restricting the present invention.

The FIGURE is solely schematic and is not to scale. Identical reference numerals identify identical or identically-acting features in the FIGURE.

BRIEF DESCRIPTION OF THE DRAWING

The FIGURE shows a view of a vehicle including a control unit according to one exemplary embodiment.

DETAILED DESCRIPTION

The FIGURE shows an illustration of a vehicle 100 including a control unit 102 according to one exemplary embodiment. At least one distance controller 106 is implemented as a driver assistance system 104 in control unit 102. Further functions (not described here) of driver assistance system 104 may be implemented in control unit 102.

Distance controller 106 is a controller for a power setpoint value 108 of vehicle 100. Power setpoint value 108 represents a power to be delivered by a drive of vehicle 100. When distance controller 106 is activated, it controls the delivered power as a function of an instantaneous distance between vehicle 100 and a preceding vehicle 110 and an acceleration intent of a driver of vehicle 100. The distance is detected by a distance sensor 112 of vehicle 100 and depicted in a distance value 114. Distance sensor 112 detects a target object ahead of vehicle 100. The acceleration intent is represented by an accelerator pedal angle 116 of an accelerator pedal 118 of vehicle 100. The acceleration intent is implemented using the distance in power setpoint value 108.

For this purpose, distance controller 106 reads in a distance target value 120. Distance target value 120 represents a minimum distance, which is specified by the driver at an interface 122 or another interface (not shown).

The minimum distance is velocity dependent. At higher velocity, the minimum distance is greater than at lower velocity. Distance target value 120 may therefore be read in as a time gap which is velocity independent.

As long as the instantaneous distance is outside a buffer range before the minimum distance, the acceleration intent is implemented directly in power setpoint value 108. If the distance is within the buffer range, the acceleration intent is implemented in reduced form in power setpoint value 108. The closer the distance is to the minimum distance, the less the acceleration intent is implemented in power setpoint value 108. If the distance corresponds to the minimum distance, distance controller 106 controls power setpoint value 108 in such a way that the distance does not fall below the minimum distance.

If a reduction of power setpoint value 108 is not sufficient to achieve distance target value 120, distance controller 106 outputs a braking setpoint value 124 for the brake system of vehicle 100, in order to brake vehicle 100, until the distance again corresponds to the minimum distance.

The driver may influence the minimum distance. If the driver increases accelerator pedal angle 116 so that it is above a threshold value and/or changes at an angular velocity which is above a threshold value, the time gap corresponding to set distance target value 120 is reduced. In particular, the time gap is reduced step by step. At minimum, the time gap may be as small as a total reaction time of the system.

If the driver again signals a reduced acceleration intent via accelerator pedal 118, the time gap is enlarged again.

If a stationary obstacle is recognized as a target object instead of external vehicle 110, vehicle 100 is braked so that vehicle 100 does not collide with the obstacle. If a stationary obstacle is incorrectly recognized, braking setpoint value 124 is also output and vehicle 100 is braked, even if the target object is actually not a stationary obstacle. The driver may assess the difference. A bag being blown around is recognized as an obstacle here, for example. The driver recognizes the bag. In the approach presented here, the driver may override the braking action before the bag by expressing an override intent 126. If override intent 126 is input during the braking action and/or the reduction of the motor power, these interventions are at least partially suspended for a predetermined time window.

Override intent 126 may be read in at accelerator pedal 118 or at interface 122. At accelerator pedal 118, for example, pedal angle 116 may be increased within a tolerance range. At interface 122, for example, a button may be pressed or a switch may be operated, for example.

Override intent 126 may be implemented in reduced form. For example, the acceleration intent may be implemented using a reduction factor so that vehicle 100 does not travel excessively fast toward the incorrectly recognized obstacle or travel past the obstacle, respectively.

During the time window, vehicle 100 may have already passed the incorrectly recognized obstacle. Vehicle 100 may subsequently drive on with reactivated distance controller 106. An initial acceleration of vehicle 100 may be limited in order to limit a resulting jolt upon the reactivation of distance controller 106 and to give the driver time to adapt his acceleration intent.

However, if the obstacle was correctly recognized and the driver incorrectly recognized it as harmless, the interventions of driver assistance system 104 are not completely deactivated in the approach presented here. An emergency braking assistant may still prevent a collision.

In other words, in the approach presented here, a time-limited deactivation of driver assistance functions 104 is carried out via operating element 122.

By way of the approach presented here, the drivability is ensured or improved in the event of influence of interference during travel using driver assistance system 104 (for example, acceleration-pedal-controlled distance controller DDA and/or adaptive cruise control ACC). This measure is significant in particular in urban areas.

The driver may request a time-limited deactivation of distance controller 106 or temporarily discard a selected target object to minimize the influence of interference, for example, adjacent lane disturbances, ghost objects, or object inheritances.

In the case of interference due to inadvertently formed target objects, the driver, when he has the adaptive cruise control active, may easily override the system by requesting via the accelerator pedal more than the adaptive cruise control, his driver intent thus being implemented. When traveling with a limited function, such as distance controller 106, a simple increase of the accelerator pedal intent may thus permit a shorter distance to the target object, but an incorrectly detected object in the driver's own lane nonetheless results in a deceleration.

It is possible to change rapidly into the override state by way of a significantly higher accelerator pedal angle (for example, kickdown) to enable further travel. However, this may be uncomfortable in the city in particular. Furthermore, the system may be deactivated via operating element 122. However, for safety reasons this deactivation generally only enables a slow increase of the motor torque. In addition, a renewed activation of the function takes place manually via operating element 122 thereafter.

In the approach presented here, a time-limited deactivation of the torque limitation or a discard of the instantaneous target object takes place with the aid of an operating element 122, for example, a steering column switch LSS. On the one hand, the interference may thus be minimized, on the other hand, it is ensured that after a short, defined time or after a target object change, the function automatically offers its safety and comfort advantages again.

To avoid undesired accelerations in the event of a deactivation, a driver-intent-dependent jolt limiting may be used.

In the case of the adaptive cruise control or higher automated functions, a discard of the selected target object, which means interference, may also result in comfort improvements, since the desired behavior is achieved again after a brief actuation of the operating element.

Finally, it is to be noted that terms such as "having", "including", etc. do not exclude other elements or steps and terms such as "a" or "one" do not exclude a plurality. Reference numerals in the claims are not to be understood as restrictive.

What is claimed is:

1. A method for operating a driver assistance system of a vehicle, the method comprising:
    while the driver assistance system is performing interventions by controlling drive parameters of the vehicle to maintain a predefined minimum distance of the vehicle from a leading vehicle in a travel mode of the vehicle, recognizing an action by a driver of the vehicle that indicates an override intent of the driver of the vehicle;
    in response to the recognition of the override intent, deactivating the performing of the interventions, wherein:
        while the performing is deactivated, the predefined minimum distance is not maintained by the driver assistance system; and
        the performing of the interventions remains deactivated by the deactivation after the action of the driver is completed until expiration of a predetermined time window; and
    reactivating the performing of the interventions by the driver assistance system.

2. The method of claim 1, wherein the override intent is read in via a manually operable operating element of the vehicle or an accelerator pedal of the vehicle.

3. The method of claim 1, further comprising:
    detecting a presence of an object in front of the vehicle; and
    identifying a probability of the detected object being an obstacle, wherein the deactivation is maintained until the expiration of the predetermined time window based on the identified probability being below a predefined threshold.

4. The method of claim 1, wherein the suspension of the interventions for a duration of the predetermined time window is implemented based on a determination that a target object triggering the interventions meets suspension parameters.

5. The method of claim 1, further comprising determining a length of the time window based on a velocity of the vehicle.

6. The method of claim 1, further comprising determining a length of the time window based on a distance of the vehicle to a detected object in front of the vehicle.

7. The method of claim 1, wherein the deactivation of the performing of the interventions includes at least partially suspending braking interventions activated by the driver assistance system.

8. The method of claim 1, wherein the deactivation of the performing of the interventions ignores a target object triggering the interventions.

9. The method of claim 1, wherein the deactivation is performed in response to the recognition of the override intent conditional upon a reading in of an additional confirmation input of the driver.

10. The method of claim 9, wherein the confirmation input is read in via the manually operable operating element of the vehicle or the accelerator pedal of the vehicle.

11. A control device for operating a driver assistance system of a vehicle, comprising:
 a control unit configured to perform the following:
  while the driver assistance system is performing interventions by controlling drive parameters of the vehicle to maintain a predefined minimum distance of the vehicle from a leading vehicle in a travel mode of the vehicle, recognizing an action by a driver of the vehicle that indicates an override intent of the driver of the vehicle;
  in response to the recognition of the override intent, deactivating the performing of the interventions, wherein:
   while the performing is deactivated, the predefined minimum distance is not maintained by the driver assistance system; and
   the performing of the interventions remains deactivated by the deactivation after the action of the driver is completed until expiration of a predetermined time window; and
  reactivating the performing of the interventions by the driver assistance system.

12. A non-transitory computer readable medium having a program code arrangement having program code that is executable by a processor and that, when executed by the processor, causes the processor to operate a driver assistance system of a vehicle by performing the following:
 while the driver assistance system is performing interventions by controlling drive parameters of the vehicle to maintain a predefined minimum distance of the vehicle from a leading vehicle in a travel mode of the vehicle, recognizing an action by a driver of the vehicle that indicates an override intent of the driver of the vehicle;
 in response to the recognition of the override intent, deactivating the performing of the interventions, wherein:
  while the performing is deactivated, the predefined minimum distance is not maintained by the driver assistance system; and
  the performing of the interventions remains deactivated by the deactivation after the action of the driver is completed until expiration of a predetermined time window; and
 reactivating the performing of the interventions by the driver assistance system.

13. The computer readable medium of claim 12, wherein the override intent is read in via a manually operable operating element of the vehicle or an accelerator pedal of the vehicle.

* * * * *